United States Patent Office 3,057,778
Patented Oct. 9, 1962

3,057,778
DICARBAMATES OF DISECONDARY
2-SUBSTITUTED 1,3-DIOLS
Werner Meiser, Stefan Breitner, Wolfgang Wirth, and Horst Kreiskott, all of Wuppertal-Elberfeld, Germany, assignors to Farbenfabriken Bayer Aktiengesellschaft, Leverkusen, Germany, a corporation of Germany
No Drawing. Filed Nov. 25, 1958, Ser. No. 776,187
4 Claims. (Cl. 167—65)

This invention relates, in general, to novel organic chemical compounds. More particularly, the invention contemplates the provision of certain aliphatic dicarbamates which are found to possess pharmacological activity as central nervous system depressants within warm-blooded animals.

The compound 2-methyl-2-n-propyl-1,3-propanediol dicarbamate of the formula:

(I)
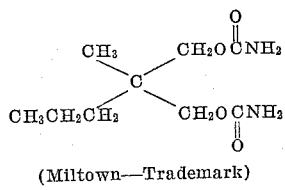

(Miltown—Trademark)

is representative of a group of known compounds referred to collectively as "tranquilizers" in the literature, in the sense that they exhibit selective action on subcortical centers and particularly the thalamus. The pharmocological activity or effect of such tranquilizers consists of a sedative and a hypnotic component; the measure of effectiveness of a true tranquilizer being based, at least in part, on the fact that the sedative effect should considerably outweigh the hypnotic effect. With reference to the foregoing compound, however, the hypnotic-action component exhibits significant influence, as witnessed by reported cases in which patients have committed rash and uncontrolled acts while under the effects of this drug. Significantly, the known compound of Formula I is a dicarbamate of two primary alcohol groups.

The present invention is based, in part, on our discovery that certain dicarbamates of diols of similar structure, but with secondary OH-groups substituted on the molecule, exhibit the same good sedative action of 2-methyl-2-n-propyl-1,3-propanediol dicarbamate while exercising much less of an hypnotic effect, and are exceptionally well tolerated. For example, the compounds of the invention are only about ⅛ as toxic as the known tranquilizer of Formula I above.

The active dose of the new compounds of this invention is between 1 and 20 mg./kg. The activity was tested according to the method described by Wirth et al. in Arch. Int. Pharmakodyn. 115 (1958), page 7. This test is especially suited for determining the pure tranquillizing activity.

The compounds of the invention may be represented in general by the following formula:

(II)
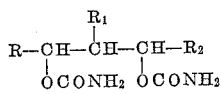

wherein R, $R_1$ and $R_2$ represent alkyl radicals bearing from 1 to 5 carbon atoms in either a normal or branched chain.

The foregoing compounds may be derived from the corresponding diols by application of conventional techniques. For example, the diols can be reacted with phosgene in the presence of a base and within an inert organic solvent system to form dichlorocarbonic esters, which may be reacted, in turn, with ammonia to yield the dicarbamates. Suitable organic solvents for use in this synthesis include benzene, toluene, chloroform, ethylene chloride, and acetone, among others. The base employed may be any of dimethylaniline, pyridine, trimethylamine, sodium hydroxide, sodium bicarbonate, and the like.

Alternatively, the diols may be reacted with phenyl chloroformate, possibly in the presence of an organic base, to form diol diphenylcarbonates, which are then reacted with ammonia, with liberation of phenol, to yield the desired dicarbamates. In addition, the diols may be reacted with urea chloride in an inert organic solvent, also possibly in the presence of a base, to form the dicarbamate; or they may be fused with urea or urea salts (with or without a catalyst) at an elevated temperature, ammonia being liberated or an ammonia salt being formed, with resulting formation of the dicarbamate. Further, the diols can be reacted with cyanic acid in an inert organic solvent, or they may be transesterified with alkyl urethans at elevated temperatures in the presence of catalysts such as aluminum propylate.

In general, the compounds of the invention dissolve relatively sparingly in water. They are particularly well tolerated by all conventional routes of administration.

To facilitate a fuller and more complete understanding of the subject matter of our invention and of how the novel compounds thereof may be produced, specific procedures for the production of several of the compounds will now be described, but it should be understood that such examples are offered for purposes of illustration, only, and are not to be construed as imposing any limitations on the scope of the subjoined claims.

EXAMPLE I

Preparation of the dicarbamate of 3-methyl-2,4-pentanediol, as represented by the formula:

(III)
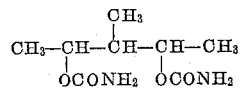

3-methyl-2,4-pentanediol, in amount of 23.6 grams (0.2 mole), was dissolved together with 48.4 grams of dimethylaniline in 200 cubic centimeters of dry benzene. The resulting solution was introduced, with stirring at 5–10° C., into a solution of 39.6 grams of phosgene in 200 cubic centimeters of dry benzene. Stirring was continued at room temperature for one hour and then at 30–40° C. for another 4 hours. The reaction mixture was then washed first with ice water and some hydrochloric acid, and finally with pure water in a separatory funnel. The benzene layer was dried with sodium sulfate, and thereafter ammonia was introduced into the filtered solution over a period of several hours. The crystal paste was filtered off by vacuum and washed with water. The residue, together with another fraction that was obtained from the benzene solution by washing with water, concentrating and precipitating with ligroin, was recrystallized from methylene chloride-ether, yielding white crystals of the desired dicarbamate of melting point 183° C.

The same compound was produced by introducing cyanic acid into a benzene solution of the diol at room temperature. In addition, the compound was produced by the following synthesis:

The diol, in amount of 23.6 grams, was dissolved with 48.4 grams of dimethylaniline in 200 cubic centimeters of dry chloroform. While stirring, 32 grams of carbamyl chloride diluted with 50 cubic centimeters of chloroform, was instilled into the solution at 0° C. After several hours of stirring at room temperature, the reaction mixture was washed successively with ice water-hydrochloric acid and with water, and was then dried with calcium chloride. Following concentration of the chloroform solution, the desired dicarbamate was precipitated by means of ligroin and recrystallized from methylene chloride-ether.

*Example II*

Preparation of the dicarbamate of 3-methyl-2,4-heptanediol, as represented by the formula:

(IV)
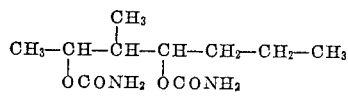

3-methyl-2,4-heptanediol, in amount of 29.2 grams (0.2 mole), was dissolved with 48.4 grams of dimethylaniline in 200 cubic centimeters of dry acetone. Into this solution, 32 grams of carbamyl chloride was instilled with stirring at 0° C.

Stirring was continued at room temperature for 3 hours, and the reaction mixture was then poured, while stirring, into 1000 cubic centimeters of ice water and 500 cubic centimeters of methylene chloride. Separation via a separatory funnel was followed by another extraction with methylene chloride. The combined methylene chloride extracts were washed first with dilute HCl and then with water. After drying with calcium chloride and concentration of the methylene chloride solution, addition of ether yielded the desired dicarbamate in the form of white crystals of melting point 176° C.

The compound was also produced by application of the alternate synthesis described in Example I.

Having thus described the subject matter of our invention, what it is desired to secure by Letters Patent is:

1. A chemical compound represented by the formula:

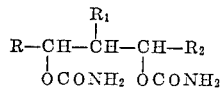

wherein R, $R_1$ and $R_2$ are alkyl radicals containing from 1 to 5 carbon atoms.

2. The dicarbamate of 3-methyl-2,4-pentanediol.
3. The dicarbamate of 3-methyl-2,4-heptanediol.
4. A tranquilizing composition adapted for the treatment of neurotic conditions comprising a pharmaceutical carrier and a medicament active on the central nervous system as represented by the formula:

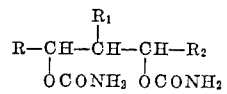

wherein R, $R_1$ and $R_2$ are alkyl radicals containing from 1 to 5 carbon atoms.

References Cited in the file of this patent

FOREIGN PATENTS 818,574     France _____ Sept. 29, 1937

OTHER REFERENCES

Berger et al.: J. Pharm. & Exp. Ther., vol. 116, pp. 337–42 (1956).